(No Model.)  H. DEITZ.  2 Sheets—Sheet 1.
CAR COUPLING.
No. 515,903.  Patented Mar. 6, 1894.
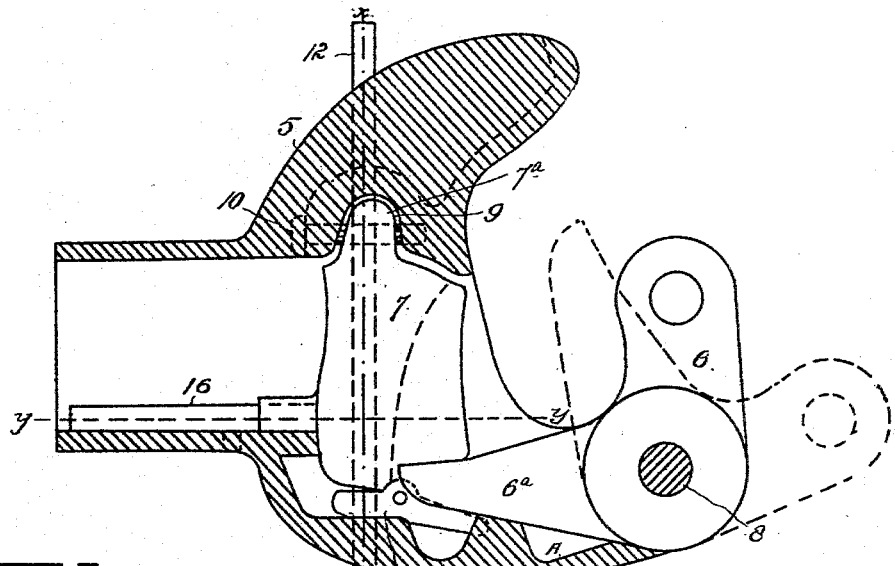
Fig. 1.
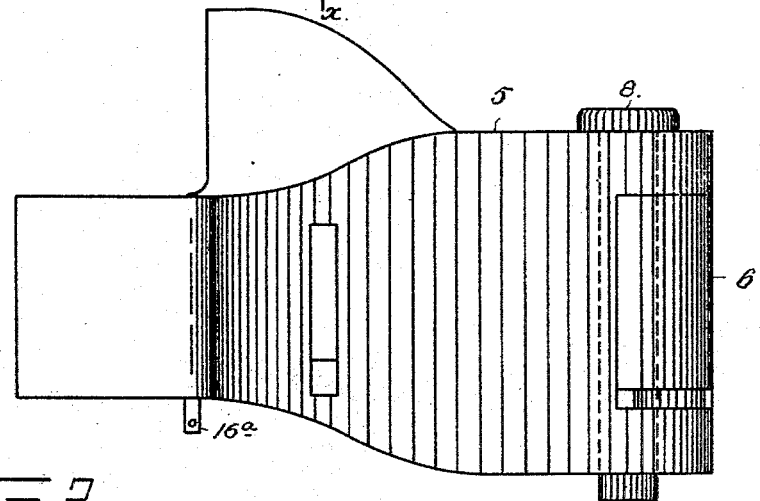
Fig. 2.
Fig. 3.
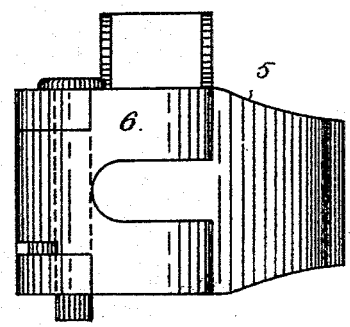
WITNESSES:
G. J. R. Claudet
I. M. Sale
INVENTOR
Henry Deitz
BY
A. J. O'Brien
ATTORNEY.

(No Model.) 2 Sheets—Sheet 2.
H. DEITZ.
CAR COUPLING.
No. 515,903. Patented Mar. 6, 1894.
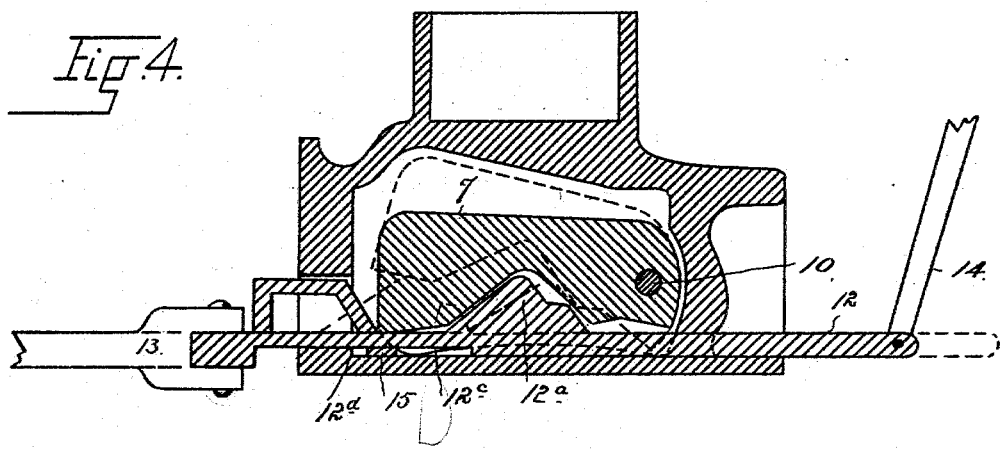
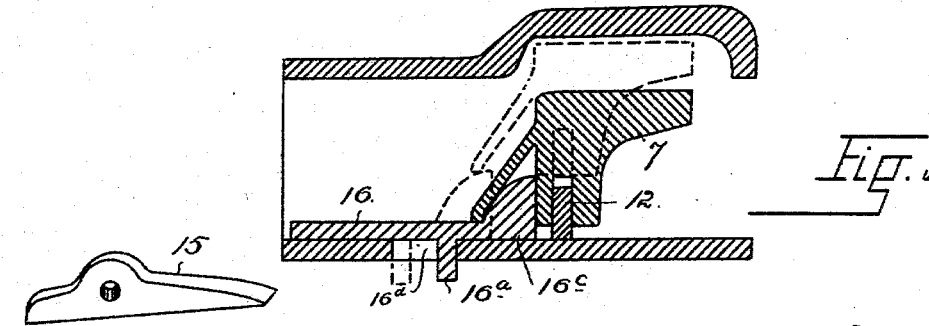
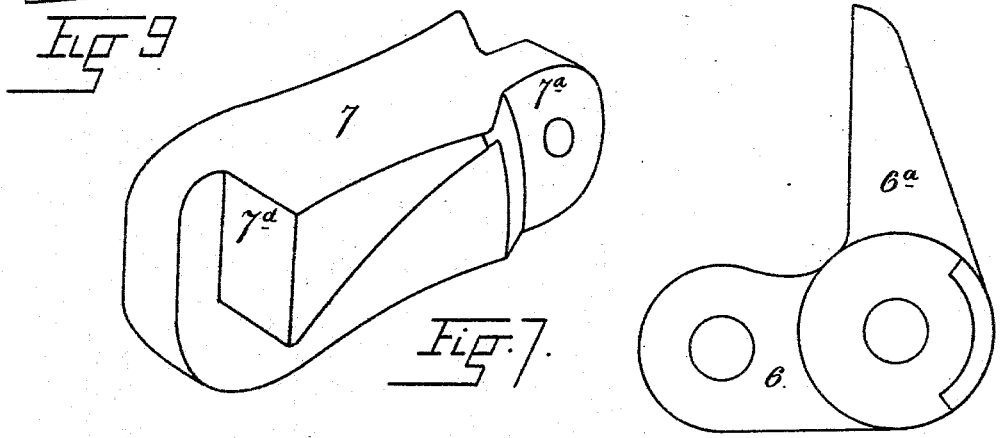
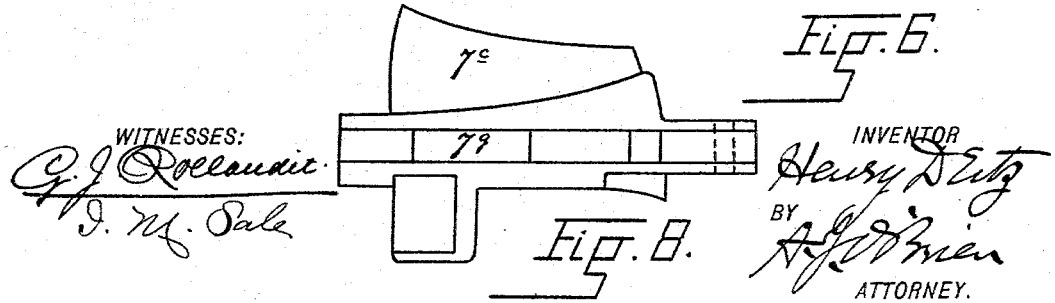
WITNESSES:
INVENTOR
Henry Deitz
BY
A. J. O'Brien
ATTORNEY.

UNITED STATES PATENT OFFICE.

HENRY DEITZ, OF DENVER, COLORADO.

CAR-COUPLING.

SPECIFICATION forming part of Letters Patent No. 515,903, dated March 6, 1894.

Application filed June 2, 1893. Serial No. 476,323. (No model.)

*To all whom it may concern:*

Be it known that I, HENRY DEITZ, a citizen of the United States of America, residing at Denver, in the county of Arapahoe and State of Colorado, have invented certain new and useful Improvements in Car-Couplers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in car couplers, and consists of the features, arrangements and combinations hereinafter described and claimed, all of which will be fully understood by reference to the accompanying drawings in which is illustrated an embodiment thereof.

In the drawings, Figure 1 is a section taken through the shell of the draw-head above the operating parts. Fig. 2 is a side view of the same. Fig. 3 is a front view thereof. Fig. 4 is a section taken on the line $x$—$x$, Fig. 1. Fig. 5 is a section taken on the line $y$—$y$, Fig. 1. Fig. 6 is a top view of the coupling-hook. Fig. 7 is a perspective view of the locking dog. Fig. 8 is an underneath view of the same. Fig. 9 is a top view of the dog for throwing the coupling hook to the uncoupled position after the latter has been released from the locking dog.

Similar reference characters indicating corresponding parts or elements of the mechanism in the several views, let the numeral 5 designate the body of the draw-head recessed to receive the pivoted coupling-hook 6 and the locking dog 7, engaging the hook 6 when the latter is in the coupled position. The coupling-hook is horizontally pivoted and retained in the draw-head by the vertical pin 8. One extremity $7^a$ of the locking dog is reduced to enter a recess 9, and is apertured to receive a horizontal pivot pin 10 which maintains the dog in place. The shell of the draw-head is interiorly recessed sufficiently to allow this dog a suitable vertically oscillating movement. The front part of the locking dog 7 is cut away underneath to form an inclined face $7^c$ which face slopes downward from the right toward the left as shown in Figs. 7 and 8, assuming that the dog occupies its normal or horizontal position. Hence as the tongue $6^a$ of the coupling hook moves inward toward the coupled position, said tongue engages this inclined face and raises the dog sufficiently to allow the tongue to occupy the position shown in Fig. 1, when the dog drops down, locking the coupling-hook in place, since the end of the tongue then engages the vertical face $7^d$.

The means for raising the dog and releasing the coupling-hook will now be described: The locking dog 7 is recessed on its under surface as shown at $7^g$ to receive a projection $12^a$ formed on the transversely reciprocating bar 12 which passes through both walls of the shell of the draw-head, projecting on either side thereof. The walls of the recess $7^g$ are composed of two inclined faces which meet at the deepest part of the recess. The projection on the bar 12 is of corresponding shape and the dog is raised by moving the bar 12 laterally in either direction. To the extremity of this bar 12 may be attached arms which extend outward within easy reach of the trainman without going between the cars, whereby the unlocking bar is manipulated for the purpose stated.

For passenger-car use, an upwardly projecting lever may be attached to one extremity of the bar 12 whereby said bar may be actuated from the platform of the car. This use is illustrated at the right in Fig. 4, the numeral 14 designating the upright lever, while 13 at the left in the same figure designates the laterally projecting arm employed when the coupler is used on freight cars. A small dog 15 is pivoted in the bottom of the draw-head's recess and near one side of its outer wall. One arm of this dog lies in the path of the shoulders $12^c$ and $12^d$ on the bar 12 whereby as said bar is moved in one direction, the dog is actuated by the engagement of one shoulder of the bar 12 with said arm of the dog. This movement of the one arm forces the other arm outward to engagement with the tongue $6^a$ of the coupling-hook, thus throwing the same to the unlocked position shown in dotted lines in Fig. 1. It will, of course, be understood that in manipulating the arm 12, the locking dog 7 is first raised and the coupling-hook released before the shoulder of the bar engages the dog and expels the tongue 6ª as heretofore stated. The movement of the bar 12 in the opposite direction returns the dog 15 to its original position. To the rear extremity of the draw-head is movably attached a bar 16 provided with a depending projection 16ª which passes through a slot 16ᵈ formed in the draw-head. The forward extremity of this bar is provided with an upright projection 16ᶜ having an inclined face. This projection engages a counterpart recess formed in one side of the locking dog. The object of the bar 16 is to automatically raise the locking dog and release the coupling hook in case of accident which would otherwise result in the pulling out of the draw-head from the end of the car. The rear extremity of this bar 16 must be attached to a stationary part of the car, and the arrangement and construction are such that if the draw-head moves farther out of the car than is necessary in the proper performance of its function, or in other words, if in case of accident, the draw-head will no longer stand the strain incident to the hauling of the train, a slight outward movement of the draw-head will cause the locking dog to rise to the position shown by dotted lines in Fig. 5, thus releasing the coupling-hook and uncoupling the cars; whereas if the draw-head were allowed to pull out it would drop down upon the track and perhaps ditch the train.

The operation of my improved coupling will be readily understood. If either or both coupling-hooks are unlocked, or in the position shown by dotted lines in Fig. 1, the engagement of the one hook with the other as the cars approach each other will force the hooks to the coupled position, when the locking dogs will fall to the locked position by gravity. The uncoupling of the cars by the manipulation of the bar 12 has already been described.

Having thus described my invention, what I claim is—

1. In a car coupler, the combination with the draw-head, and the pivoted coupling-hook, of the vertically oscillating locking dog and the transversely reciprocating bar for manipulating the dog, substantially as described.

2. In a car coupler, the combination with the draw-head and the coupling-hook, of the vertically oscillating locking dog, and the transversely reciprocating bar carrying a projection adapted to engage a recess formed in the dog, whereby the movement of the bar in either direction raises the dog and releases the hook, substantially as described.

3. In a car coupler, the combination with the draw-head and the coupling-hook, of the vertically-oscillating locking dog, the transversely reciprocating bar for manipulating said dog, and a horizontally pivoted dog actuated by the reciprocating bar and adapted to throw the coupling hook to the uncoupled position, substantially as described.

4. In a car coupling, the combination with the draw-head and the coupling-hook, of the vertically oscillating locking dog, and the rearwardly extending bar connected thereto and attached to a stationary part of the car, as and for the purpose set forth.

In testimony whereof I affix my signature in the presence of two witnesses.

HENRY DEITZ.

Witnesses:
J. R. ZEARING,
H. H. ZEARING.